Figure 1:
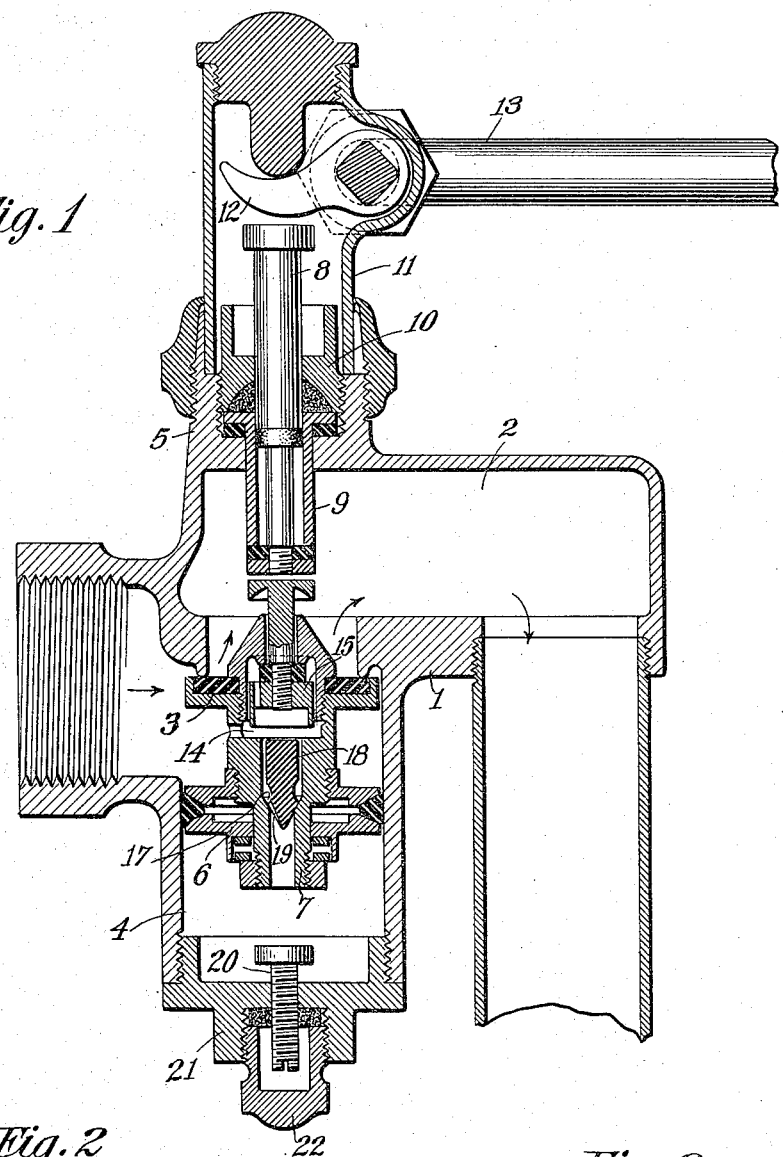

E. G. HEDGES.
SELF CLOSING VALVE.
APPLICATION FILED JAN. 4, 1912.

1,176,754.

Patented Mar. 28, 1916.

Witnesses:
Raphaël Netter
Samuel C. Yeaton

Edward G. Hedges, Inventor
By his Attorney
Hillary C. Messimer

UNITED STATES PATENT OFFICE.

EDWARD G. HEDGES, OF NEWARK, NEW JERSEY.

SELF-CLOSING VALVE.

1,176,754. Specification of Letters Patent. Patented Mar. 28, 1916.

Application filed January 4, 1912. Serial No. 669,509.

*To all whom it may concern:*

Be it known that I, EDWARD G. HEDGES, a citizen of the United States, residing in the city of Newark, county of Essex, and State of New Jersey, have invented certain new and useful Improvements in Self-Closing Valves, of which the following is a specification.

My invention relates to self closing valves, and more particularly to that type that are closed by an element in connection with the valve, which element is itself operated upon by an increasing volume of water under pressure from the water supply. With such constructions the valve is ordinarily manually operated to open, with which operation the closing element is likewise operated to displace the water from an adjacent chamber. The chamber is in communication with the water supply through a very small passageway termed a bleeding hole, which, as soon as the displacing movement of the element is arrested, serves as an inlet to refill the chamber from the water supply and thereby to return the element to its first position, thereby closing the valve connected with it. Such valves are used in toilets, sinks and similar places, where it is desired that a certain quantity of water should pass the valve before it is closed. Accordingly the bleeding hole is usually throttled by a needle valve, which is set to retard the flow of water to the chamber to prolong the closing of the valve until the required amount of water has passed, and other means are provided to afford a quick and ample exit for the water in the chamber during the displacing movement to prevent back pressure in order that the opening may be effected quickly and with as little effort as is feasible.

The needle valve, as ordinarily used, is easily choked by the grit or sediment in the water, which prevents the closing of the main valve, with the obvious waste of water.

The object of my invention is to provide in the valve closing element a release valve furnishing nonadjustable means for supplying the chamber with a uniform flow of water in combination with means to adjust the effective size of the chamber to offset the unadjustability of the said release valve, and the further combination of a relief valve manually operated to secure an automatic opening of the release valve followed by an opening of the main valve.

A further object of my invention is to give the release valve and valve seat therefor a convenient shape and position so that it will be most effectively acted on by the water forced through it from the chamber to produce a scouring action thereon and to remove any foreign matter that may have accumulated.

A further object is to construct a release valve with a groove forming a nonadjustable passageway for the water through the chamber of such a shape and position that it will be most easily cleansed from any foreign matter by the water passing from the chamber when the valve is opened.

Figure 2:
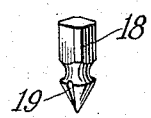
Figure 3:
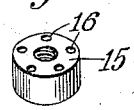

Referring to the drawing forming a part of this specification, Figure 1 is a main central sectional elevation of a self closing valve containing my improvements. Fig. 2 is a perspective view of the valve restricting the bleeding hole; and Fig. 3 is a perspective view of the outlet valve from the chamber.

My invention has general application to any valve of the type above referred to, whether it be for a toilet flush valve, sink valve, or otherwise, but I have preferred to illustrate its utilization in connection with the valve shown in my co-pending application filed December 26, 1911, and bearing Serial No. 667,701. Reference is made to that application for a detailed description of such a valve, and only a brief description, as is thought necessary for the present purposes, will be made here.

The casing 1 of the device comprises a conduit 2, in which there is a valve seat for the main valve 3, and through which the water flows when the valve is open from the inlet to the outlet, as indicated by the arrows. A chamber 4 is provided in the casing at one side of the seat, and a boss 5 at the other, both in alinement with the seat. A piston 6 slidably engaging the walls of the chamber is secured on a stem 7 projecting from the valve, and serves as the displacing element for the water in the chamber, it being moved when the valve is opened by the aid of mechanical means to effect this displacement, and as the closing element for the valve, it being moved for this purpose by the water refilling the chamber.

The valve and piston are operated to open by a plunger 8 slidably mounted in a cylinder 9 secured through a hole in the boss by the stuffing box 10. The boss is provided with a head 11, in which is mounted a rocker shaft, on which is secured the arm 12 engaging the plunger 8 to open the valve, and an operating arm 13 for operating the arm 12. For a more detailed description of this valve opening mechanism and the piston 6, reference is made to the above mentioned application.

Referring now more particularly to the features of the present construction involving a preferred embodiment of my invention, the stem 7 is provided with a three-way orifice 14, affording communication between the chamber, the conduit and the source of water supply. This serves as the bleeding hole for refilling the chamber from the water supply for the return stroke, and as the exit for the water from the chamber to the conduit on the opening stroke. The orifice is formed with a valve seat for engaging a relief valve 15, which is similar to my prior invention above referred to, except that I have perforated the valve with holes 16. The orifice is provided with a second valve seat 17, preferably of conical formation, for receiving the conical end of an auxiliary or release valve 18. This is shown in its preferred form as having a square body with rounded corners for loosely fitting it in the orifice and giving ample room for the exit of the water. The conical portion may fit its seat snugly, but a slight orifice is provided between the two, preferably by forming a small groove 19 in the conical face of the valve.

The movement of the valve and piston is confined between the valve seat and an adjustable screw 20 affording a stop for the end of the stem 7. The screw is secured in the cap 21, closing the chamber and affording means for installing the valve and piston when removed. A screw plug 22 is provided to conceal the end of the screw 20, and made water tight by the use of a washer in the usual manner.

My device operates as follows: When the operating handle is swung in the direction away from the device, the plunger is brought into engagement with and opens the valve 15. The movement of this is slight, due to the stop shoulder formed in the orifice 14. The valve is chambered so that the stopping of it by the shoulder will not effect a closing of the holes 16. Further movement of the plunger operates to open the main valve 3 and to move the piston into the chamber for displacing the water therein. This water forces the valve 18 open, which affords ample room for the water to flow past it and past the loosely fitting valve 15 and holes 16 formed therein to the conduit 2. As soon as the main valve is open its entire distance the operator releases his hold on the handle. The plunger and valve 15, which are made in accordance with my previously referred to application, are automatically closed, as there described, by the water flowing through the conduit. The water from the supply source now begins to enter the orifice through the opening communicating therewith, and at once closes the valve 18 with the exception, however, of the small opening afforded by the groove 19. The water from the supply source refills the chamber through this small opening, and thereby gradually returns the piston and the main valve to closed position. The sediment that usually is most harmful in clogging the needle valve is that which settles in the chamber and which is disturbed when the displacement takes place, causing it by the pressure of the piston to be forced in the needle valve to destroy its action. In my device it can readily be seen that the valve 18 sufficiently opens to permit all this sediment to pass, and should the orifice be clogged by the water feeding the chamber (which is highly improbable), at least some water will have reached the chamber, and this will effect a thorough cleaning of the orifice when the device is again operated. The quantity of water passing at any one opening of the main valve depends upon the distance it is moved, the size of the orifice at the groove 19, and the pressure of the water flowing through it from the water supply. In my present invention the orifice at the groove 19 remains uniform, but the pressure of the water may vary, especially where the devices are installed on different floors in buildings. In order, therefore, to permit a uniform quantity of water to pass through each device set at the points of different pressures, it is necessary to vary the distance the valve and piston travel to compensate for the variation in pressure of the water. This is easily accomplished by a proper adjustment of the stop screw 20, which limits travel of these parts.

Having thus described my invention, I claim:

1. In a self-closing valve, the combination of a valve body having a water chamber and a main valve, a valve closing member connected with said main valve and moving in said water chamber, an auxiliary valve carried by said valve closing member freely removable relative thereto and adapted to control the passage of water into and from said water chamber, means separate from the auxiliary valve for advancing said valve closing member into said water chamber and for simultaneously relieving the seating pressure on said auxiliary valve to permit the water in the chamber to unseat the same and facilitate the outflow of the water from said chamber.

2. In a self-closing valve, a main valve, mechanical means for opening said main valve, hydraulic means for reseating said main valve, including a water chamber, an auxiliary valve for releasing the water in said water chamber in the opening movement of said main valve, and means for relieving the pressure on said auxiliary valve opposing the pressure in said chamber when said main valve is opened, to facilitate the opening of said auxiliary valve.

3. In a self-closing valve, a casing having a passageway for the flow of water, a chamber at one side thereof and a valve seat formed in the passageway, a valve for said seat separating the inlet end from the outlet end of the passageway, a valve closing element in the passageway and rigidly secured to the valve, a three way orifice through the valve and closing element affording communication between the chamber and the inlet and outlet ends of the passaweway, a release valve in the orifice at the chamber end for partly closing the orifice, a relief valve in the orifice at the outlet end of the passageway for closing the orifice thereto, and manually operated means for opening the relief valve.

4. In a self-closing valve, a main valve, mechanical means for unseating said main valve, hydraulic means for reseating said main valve, including a water chamber and a valve closing element moving therein, said element having a tubular stem through which the water may escape from said chamber as the valve is opened, the bore of said stem being enlarged to provide a frusto- conical valve seat facing away from said chamber, a second valve freely movable in said enlarged portion and incompletely filling the same to permit water to pass thereby, said second valve provided with a conical head for snugly fitting said frusto-conical seat, said head provided with a groove to permit a slight leakage when said second valve is seated.

5. In a self-closing valve, a casing having a passageway for the flow of water, a chamber at one side thereof and a valve seat formed in the passageway, a valve for said seat separating the inlet end from the outlet end of the passageway, a valve closing element in the passageway and rigidly secured to the valve, a three way orifice through the valve and closing element affording communication between the chamber and the inlet and outlet ends of the passageway, a release valve in the orifice at the chamber end for partly closing the orifice, a relief valve in the orifice at the outlet end of the passageway for closing the orifice thereto, manually operated means for opening the relief valve, and means for adjusting the effective size of the chamber.

In testimony whereof I have hereunto set my hand in the presence of two witnesses.

EDWARD G. HEDGES.

Witnesses:
SAMUEL C. YEATON,
OLIVE B. KING.

Copies of this patent may be obtained for five cents each, by addressing the "Commissioner of Patents, Washington, D. C."